(12) United States Patent
Squair (10) Patent No.: US 9,841,820 B2
(45) Date of Patent: Dec. 12, 2017

(54) INTERACTIVE HAPTIC SYSTEM FOR VIRTUAL REALITY ENVIRONMENT

(71) Applicant: Bruce William Charles Squair, Edmonton (CA)

(72) Inventor: Bruce William Charles Squair, Edmonton (CA)

(*) Notice: Subject to any disclaimer, the term of this patent is extended or adjusted under 35 U.S.C. 154(b) by 28 days.

(21) Appl. No.: 15/052,404

(22) Filed: Feb. 24, 2016

(65) Prior Publication Data
US 2017/0242485 A1 Aug. 24, 2017

(51) Int. Cl.
*G08B 6/00* (2006.01)
*G09B 21/00* (2006.01)
*H04B 3/36* (2006.01)
*G06F 3/01* (2006.01)

(52) U.S. Cl.
CPC .............. *G06F 3/016* (2013.01); *G06F 3/011* (2013.01)

(58) Field of Classification Search
CPC combination set(s) only.
See application file for complete search history.

(56) References Cited

U.S. PATENT DOCUMENTS

2009/0231287 A1* 9/2009 Rogowitz ............... G06F 3/041
345/173
2010/0277469 A1* 11/2010 Borrel ..................... G06F 3/016
345/419

* cited by examiner

*Primary Examiner* — Travis Hunnings
(74) *Attorney, Agent, or Firm* — Mark Terry (57) ABSTRACT

A physically interactive haptic system for a virtual reality environment. The system includes a plurality of actuating cylinders arranged perpendicularly to a plane. Each said cylinder includes a rod portion that moves within a series of telescoping-tube portions. Additionally, each said cylinder is designed to support the weight of a human. The system also includes a computing device, including a processor, for individually controlling each of the plurality of actuating cylinders. The computing device is configured for sending command signals to each of the plurality of actuating cylinders. A command signal instructs an actuating cylinder to move a rod portion within a telescoping-tube portion, so as to physically create a haptically-enhanced object in the virtual reality environment. A plurality of couplings for individual conductively coupling each of the plurality of actuating cylinders to the computing device.

13 Claims, 6 Drawing Sheets

INTERACTIVE HAPTIC SYSTEM FOR VIRTUAL REALITY ENVIRONMENT

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to the field of haptic devices, and more specifically to systems to be used in conjunction with virtual reality systems.

BACKGROUND

Computers and the Internet are used for conducting commerce and experiencing entertainment, as well as for experiencing media, for educational purposes and for communicating and socializing with others. Virtual reality is one method in which people use computers and technology to interact or socialize with others. Virtual reality is a computer-generated simulation of a two or three-dimensional image or environment that can be interacted with by a person or user using special electronic equipment, such as a helmet with a screen inside or other devices filled with sensors. Avatars are computer generated figures that represent people within a virtual reality environment. Users use computing devices to control their avatars within the virtual reality environments. As an avatar moves within the virtual reality environment, a user or operator experiences content through the devices that are adapted to display the visual, audio and other types of content that are provided to the devices. Some virtual reality systems allow a first user's avatar to interact with a second user's avatar thereby providing the users with a sense of community. However, the existing systems do not allow the users to experience a fully immersive experience.

More recently, people have begun to use haptic devices to further enhance their virtual reality experiences. Haptic devices allow a user to somewhat interact with the virtual reality environments by providing the user with some sense of how the virtual reality environment feels in the real world environment. However, the existing haptic devices do not provide the user with very life-like sensations.

Another problem with existing virtual reality haptic systems is that many haptic systems are limited only to handheld devices. The handheld devices are unable to provide the virtual reality system user with the ability to fully emerge themselves in virtual reality environments.

Therefore, a need exists for improvements over the prior art. There is also a need for methods and systems that make the virtual reality experience more realistic. There is also a need for a more fully immersive virtual reality experience.

SUMMARY

A physically interactive haptic system for a virtual reality environment is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a physically interactive haptic system for a virtual reality environment is disclosed. The system includes a plurality of actuating cylinders arranged perpendicularly to a plane. Each said cylinder includes a rod portion that moves within a series of telescoping-tube portions. Additionally, each said cylinder is designed to support the weight of a human. The system also includes a computing device, including a processor, for individually controlling each of the plurality of actuating cylinders. The computing device is configured for sending command signals to each of the plurality of actuating cylinders. A command signal instructs an actuating cylinder to move a rod portion within a telescoping-tube portion, so as to physically create a haptically-enhanced object in the virtual reality environment. A plurality of couplings conductively couples each of the plurality of actuating cylinders to the computing device.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting, reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a physically interactive haptic system for a virtual reality environment. The haptic system provides a more fully immersive virtual reality experience by providing a system that physically creates haptically-enhanced objects in the virtual reality environment. The system provides a plurality of actuating cylinders comprising a rod portion that moves within a series of telescoping-tube portions, wherein each of the cylinders are designed to support the weight of a human.

Figure 1:
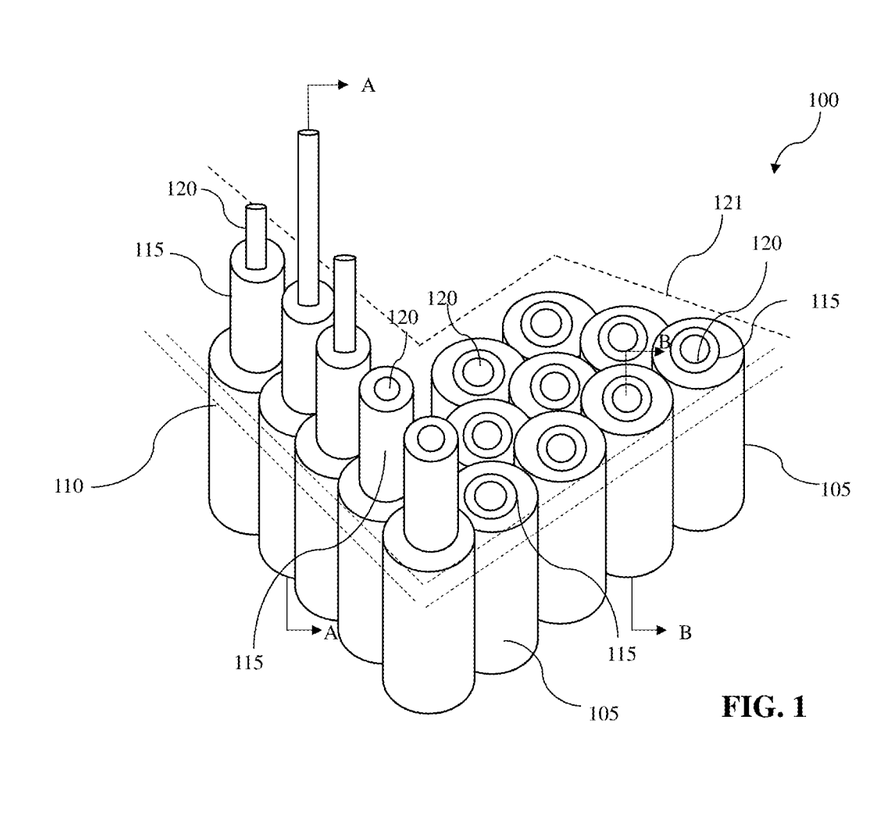
FIG. 1 is a perspective view of a physically interactive haptic system for a virtual reality environment, wherein a plurality of actuating cylinders each include a series of telescoping-tube portions, according to an example embodiment.
Figure 1A:
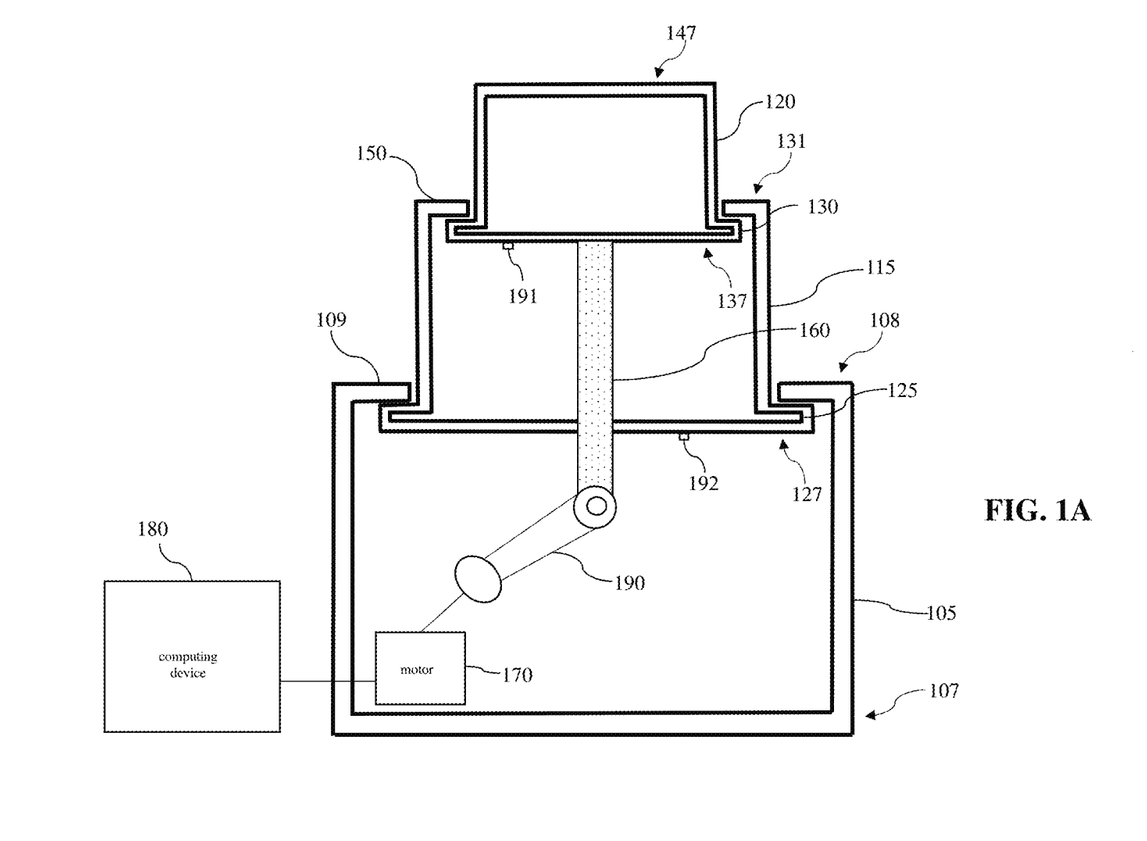
FIG. 1A is cross sectional side view of an actuating cylinder of the physically interactive haptic system in a fully extended position, according to an example embodiment.

Referring now to the Figures, FIG. 1-1B will be discussed together. FIG. 1 is a perspective view of a physically interactive haptic system 100 for a virtual reality environment. The system includes a plurality of actuating cylinders 105 arranged perpendicularly to a plane 110. While in the present embodiment cylinders are not included beyond line 121, it is understood that the cylinders can be arranged to include planes that extend beyond 121 to form various shapes having a variety of areas. For example, the planes may have an area of a square, a rectangle, a diamond, a circle, a triangle etc. In the present embodiment, the plurality of cylinders is vertically situated to form a horizontal plane. In other embodiments, the cylinders may be situated perpendicular to planes that are vertical or angled at any degree. In other embodiments, the system forms a polygon structure (not shown) that includes a plurality of planes comprising actuating cylinders arranged perpendicular to each plane, wherein each plane has an end and wherein one end of each plane is coupled to an end of an adjacent plane. The polygon structure is such that a user can be positioned inside the structure so that the user can interact with the surfaces of the system.

Figure 1B:
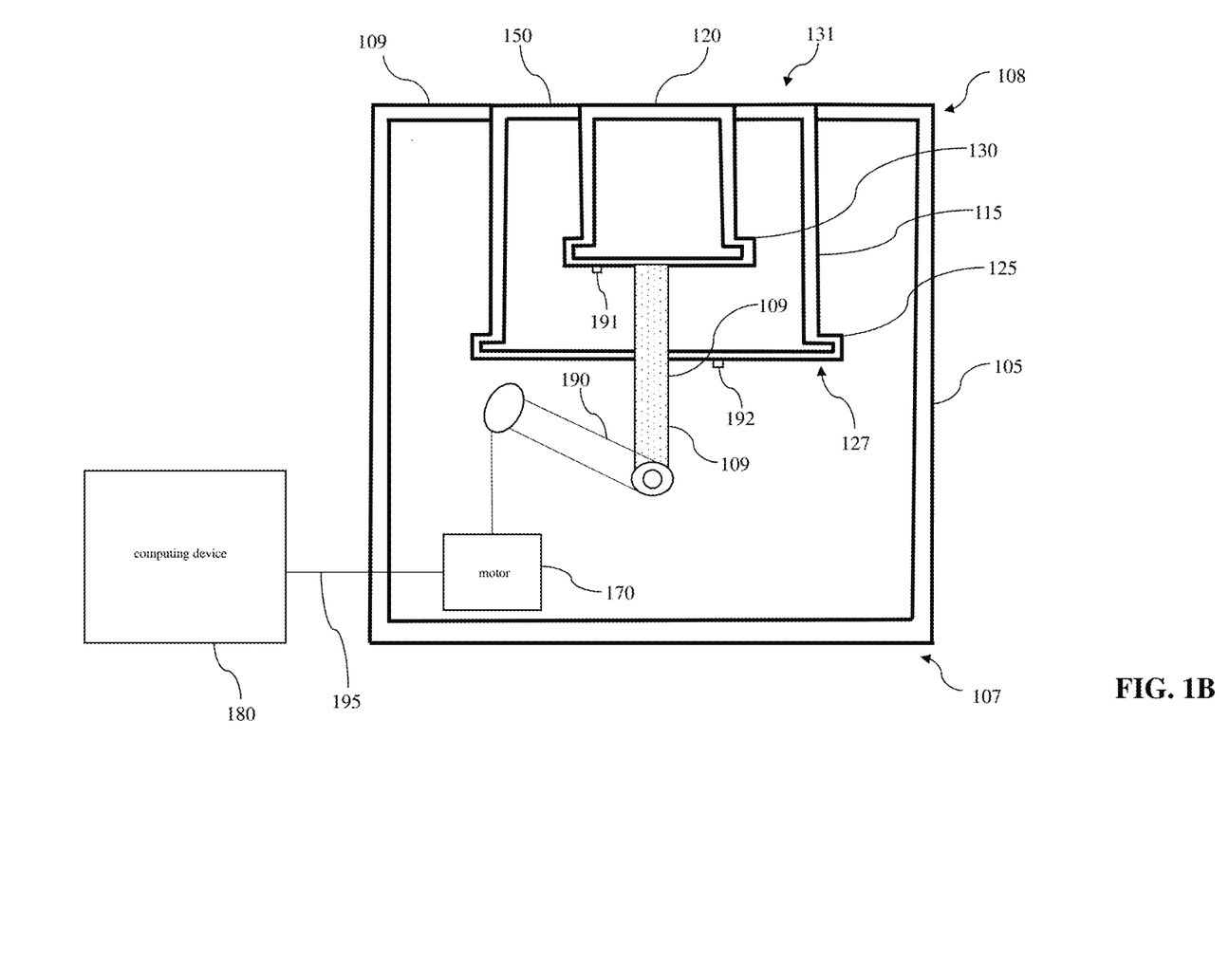
FIG. 1B is cross sectional side view of the actuating cylinder of the physically interactive haptic system in a fully retracted position, according to an example embodiment.

FIG. 1A is cross sectional side view of an actuating cylinder of the system taken along line A and FIG. 1B is cross sectional side view of an actuating cylinder taken along line B. FIGS. 1A and 1B illustrate the components inside the actuating cylinder. Each actuating cylinder may comprise rigid materials such as carbon steel, low and high alloy steel, stainless steel, aluminum, titanium, polyethylene, polyvinyl chloride (PVC), acrylonitrile-butadiene-styrene (ABS) copolymers, fiber-reinforced polymers, or any combination thereof. Additionally, other materials having rigid properties can be used and are within the spirit and scope of the present invention. Each said cylinder comprising a rod portion 160 (illustrated in FIGS. 1A and 1B) that moves within a series of telescoping-tube portions. In the present embodiment, the series of telescoping-tube portions are illustrated as a second tube portion 115 and third tube portion 120.

In the present embodiment, the lower end 137 of the third tube portion includes a flanged section or shoulder 130 protruding outward from the body of the third tube portion. The upper end of the second tube portion 115 includes a lip 150 inwardly protruding from the body of the upper end of the second tube-portion and a flanged section or shoulder 125 protruding outward from the body of the lower end 127 of the second tube section. The cylinder 105 also includes a lip 109 inwardly protruding from the body of the upper end 108 of the cylinder. In operation, a stop is provided when the rod fully extends the telescoping tubes as the lip 150 of the second tube portion interacts with the flanged section 130 of the third body (as illustrated in FIG. 1B). Similarly, a stop is also provided when the rod portion fully extends the telescoping tubes as the lip 109 of the cylinder interacts with the shoulder 125 of the second body (as illustrated in FIG. 1B). However, other means of form telescoping tubes may also be used and are within the spirit and scope of the present invention. It is also understood that in other embodiments, more or less tube portions may be used. Each cylinder is designed to support the weight of a human. However, in other embodiments that are configured for interaction with only a small portion of a user's body, such as a user's hand, the cylinders are not required to be adapted to support the weight of a human.

The rod portion 160 moves within cylinder so that it either moves (extends, retracts or maintains) the telescoping-tube portions 115, 120. The rod portion may comprise rigid materials such as carbon steel, low and high alloy steel, stainless steel, aluminum, titanium, polyethylene, polyvinyl chloride (PVC), acrylonitrile-butadiene-styrene (ABS) copolymers, fiber-reinforced polymers, or any combination thereof. Additionally, other materials having rigid properties can be used and are within the spirit and scope of the present invention.

In one embodiment, a first end of the rod portion is configured to couple to the lower end 137 of the third tube portion and second end of the rod portion is coupled to a pivoting lever 190 so that as the lever pivots the rod portion moves up and down. In one embodiment the lever is pivoted using an electric motor 170. However, it is understood and within the spirit and scope of the present invention that other means of moving the piston rod may also be used, such as by using a pneumatic device, a hydraulic device, a magnetic device etc., and such means are within the spirit and scope of the present invention.

The haptic system may also include a computing device 180, including a processor, for individually controlling each of the plurality of actuating cylinders. The system may also include a plurality of couplings 195 for individual conductively coupling each of the plurality of actuating cylinders to the computing device (more fully illustrated in FIG. 4). The computing device is configured for receiving a plurality of environment data corresponding to a virtual reality environment. The computing device is configured for sending command signals to, and for receiving sensor data from sensors 191, 192, from each of the plurality of actuating cylinders. The computing device is also configured for converting environment data to a plurality of command signals to instruct the actuating cylinders to move the rod portion to change the positions of the telescoping-tube portions so as to physically create a haptically-enhanced object.

The haptic system may also include sensors 191, 192 on each of the moving telescoping tubes. The sensors monitor the position of the tubes so that the position data of the tubes can be transmitted to the computing device. The sensor may include a gyroscope, an accelerometer, Doppler sensor, GPS sensor etc. Additionally, other types sensors for determining the position of the telescoping tubes may be used and are within the spirit and scope of the present invention.

FIG. 1 illustrates a plurality of cylinders having the telescoping tubes in different positions. The computing device is configured to receive haptic data corresponding to the virtual reality environment (further explained in FIGS. 2 and 3). The computing device processes the haptic data, and then sends signals to move the rod portions. As the rod portions move, the telescoping tube portions of the plane (in this embodiment the second tube portion 115 and third tube portion 120) move to correspond with the environment data received and to the content that is displayed in the virtual reality devices.

The rod portions have a maximum stoke length defined by a maximum distance the rod portions move relative to the actuating cylinder. In the present embodiment, FIG. 1 illustrates the rod portion and telescoping tubes in the fully extended position thereby illustrating the maximum stroke length of the rod portion. As illustrated in FIG. 1, the telescoping tubes can be extended to less than the fully extended positions, which is accomplished by the rod portion being extended to a rod-stroke position less than the maximum stroke length. Additionally, the computing device is configured to move the rod portions to a plurality of stroke-length positions that are less than the maximum stroke length of the rod portions. As a result, the haptic system and position of the plurality of telescoping tube portions can be maintained in different positions so to define different objects that correspond to the virtual reality environment, such as a floor, ceiling, chair, step, tree, etc.

Figure 2:
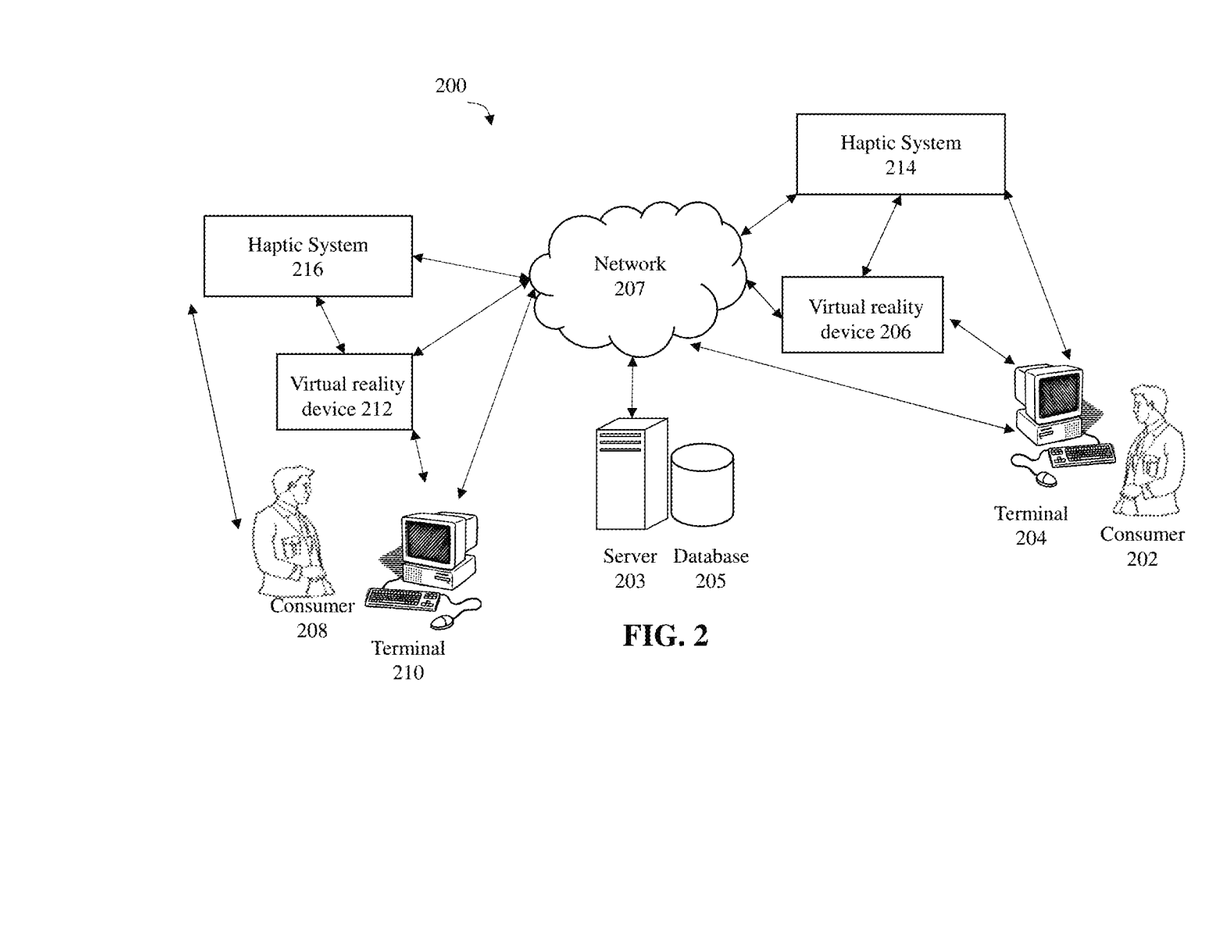
FIG. 2 is a diagram of an operating environment that supports the physically interactive haptic system for a virtual reality environment over a communications network, according to an example embodiment.

FIG. 2 is a diagram of an operating environment that supports a physically interactive haptic system for a virtual reality environment over a communications network, according to one embodiment. In one embodiment, a system 200 on a server 203 can be used for using haptic systems 214 and 216, over a communications network 207. The haptic systems create haptically-enhanced objects in the virtual reality environment so that users can more fully immerse himself/herself into the virtual reality environment. For example, the haptic systems may create the shapes of stairs, chairs, the shape of trees, walls etc. so that a user interacts with the objects created by the haptic systems, which such objects correspond to what a user observes using virtual reality devices 212, 206.

An avatar may be controlled by a physical person, consumer or user 202, 208, by a computing device having artificial intelligence, or any combination of the two. The multi-dimensional avatar may be a three-dimensional or holographic avatar. The avatar may be used by the consumer to navigate through the virtual reality graphical environment using a virtual reality device.

Each consumer may also interact other avatars, controlled by other consumers, in the virtual reality graphical environment. The virtual reality graphical environment can be a variety of different settings. The system may be configured to display or provide the multi-dimensional content, haptic content or data and accept the avatar of multiple consumers 204, 208. The multidimensional virtual reality graphical environments are also configured for allowing multiple consumers to interact with one another as well as navigate through the environment.

Virtual reality environment content is for presenting on a displaying device at each of a plurality of terminals 204, 210 or virtual reality devices 206, 212 and haptic devices 214, 216. The content may include audio multi-dimensional content, haptic content, visual multi-dimensional content and metadata. While only two consumers, 208, 202, haptic devices 214, 216, two terminals, 204, 208 and two virtual reality devices, 206, 212 are shown, this is not meant to be a limitation and multiple consumers, devices and systems may use the environment 200.

In one embodiment, the displaying device 204, 206, 210, 212 may include a monitor for the consumer to view the virtual environment and a console for such consumer to influence or navigate in the environment and a haptic device 214, 216. Each terminal 204, 210 may be integral with or separate from the haptic device 214, 216. Each consumer may navigate a corresponding avatar through the multi-dimensional virtual reality environment using the virtual reality device. In one embodiment, the virtual reality device may be a consumer virtual reality device such as goggles, a heads-up display or other input-output device. In another embodiment, the display device may include the OCULUS RIFT™, Samsung™, Gear VR™ and other head-mounted devices. The virtual reality devices may also include various sensors, detectors and output devices that allow the consumer a more lifelike experience when interacting with other consumers' avatars in the virtual reality environment. In another embodiment, the virtual reality device may be controlled by voice commands.

Each of the terminals 204, 210, virtual reality devices 206, 212, haptic device 214, 216, may comprise computing devices, such as integrated circuits, printed circuit boards, processors, ASICs, PCBs, cellular telephones, smart phones, tablet computers, desktop computers, laptops, and game consoles, for example. Terminals 204, 210, virtual reality devices 206, 212, and haptic devices 214, 216 may be connected either wirelessly or in a wired or fiber optic form to the communications network 207. The communications network may be one or more packet-switched networks, such as the Internet, or any local area networks, wide area networks, enterprise private networks, cellular networks, phone networks, mobile communications networks, or any combination of the above. In one embodiment, the terminals 204, 210 or haptic devices 214, 216 use a programmable logic controller or PLC.

Server 203 includes a software engine that delivers applications, data, program code and other information to terminals 210, 204, haptic devices 214, 216 and virtual reality devices 206, 212. The software engine of server 203 may perform other processes such as transferring multimedia data in a stream of packets that are interpreted and rendered by a software application as the packets arrive. FIG. 2 further shows that server 203 includes a database or repository 205, which may be a relational database comprising a Structured Query Language (SQL) database stored in a SQL server or a database that adheres to the noSQL paradigm. Terminals 204, 210, haptic devices 214, 216 and virtual reality devices 206, 212 may also each include databases. The database 105 may serve data from haptic devices 214, 216 and virtual reality devices 206, 212, as well as related information, used by server 203 and terminals 204, 210 during the course of operation of the invention.

Terminals 204, 210, virtual reality devices 206, 212, haptic devices 214, 216 and server 203 may each include program logic comprising computer source code, scripting language code or interpreted language code that perform various functions of the present invention. It should be noted that although FIG. 2 shows only two terminals 204, 210, haptic devices 214, 216 and one server 203, the system of the present invention supports any number of terminals or computing devices connected via network 207. Also note that although server 203 is shown as a single and independent entity, in one embodiment, server 203 and its functionality can be realized in a centralized fashion in one computer system or in a distributed fashion wherein different elements are spread across several interconnected computer systems.

Various types of data may be stored in the database 205 of the server 203. For example, the database may store environment data associated with the virtual reality environment for presenting on each haptic device. This environment data may include haptic data. The haptic data may include the shapes, texture, dimensions, and other attributes that can by sensed by touch of the physical appearances of the virtual reality environment. For example, the virtual reality environment may include steps, a wall, the shape of a tree, etc. The haptic data may also include the data corresponding to the vibrations or movements produced by objects or other avatars within the virtual reality environment.

Figure 3:
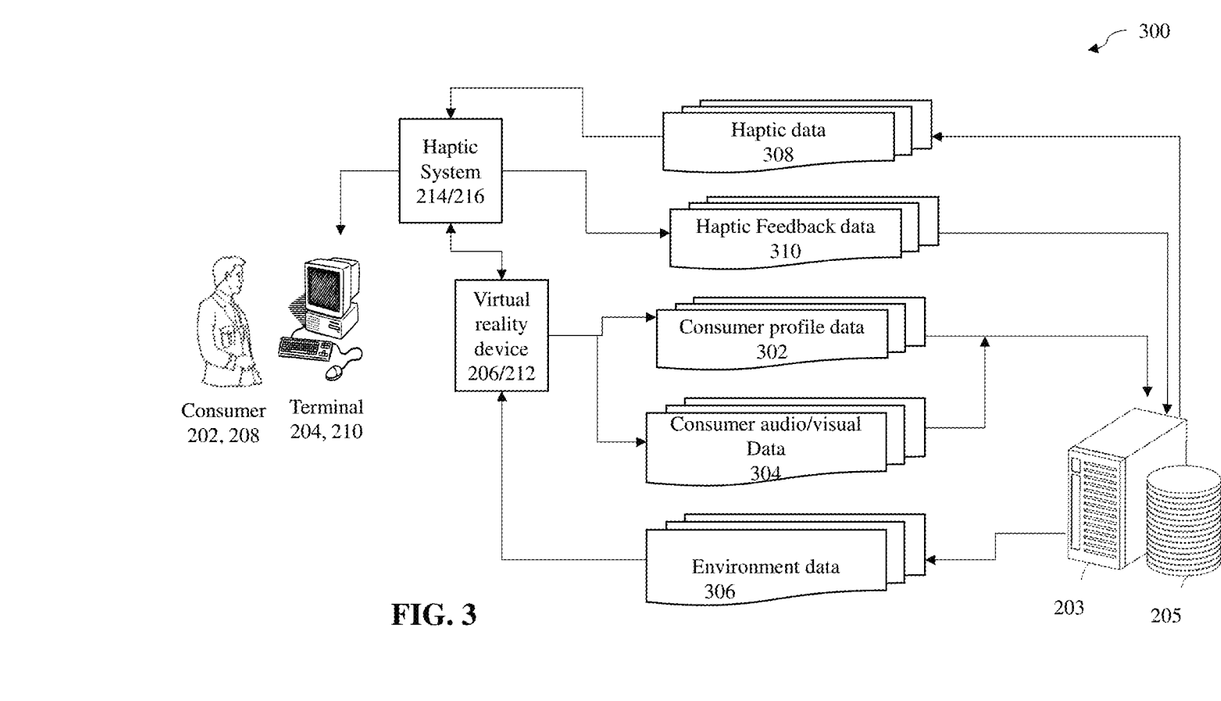
FIG. 3 is a diagram illustrating the data flow 300 of the physically interactive haptic system for a virtual reality environment over a communications network, according to an example embodiment; and, FIG. 4 is a block diagram of an example computing device and other computing devices associated with the system, according to an example embodiment.

FIG. 3 is a diagram illustrating the data flow 300 process for supporting a physically interactive haptic system for a virtual reality environment over a communications network, according to an example embodiment. The process includes the general steps that occur when a consumer experiences, interacts, participates, and/or navigates within the virtual reality environment. First, a consumer 202, 208 interfaces with the terminal that such consumer intends to use to interface with the environment. This may include wearing a virtual reality device and/or accessing a website page. The user will also be in an environment that has access to the haptic system.

If a consumer profile has not been created, the consumer creates a consumer profile and provides consumer profile data 302. The consumer profile can include one or more personal parameters or consumer profile provided by the consumer. These personal parameters may include the geographic location, age, sex and other demographics or information personal to the consumer. These personal parameters may also be obtained through interface with various social networks such as Facebook, Instagram, Twitter, etc. The consumer may also upload other audio and visual data 304, the data is processed so as to place it in a form or format for creating a user avatar, wherein the avatar may comprise a three dimensional graphical representation of one or more surfaces. Each avatar and profile data can be stored in the attached database, 204.

Once a user profile and avatar are created, then a user may log in and select the avatar with which the consumer intends to experience and navigate the multidimensional virtual reality environment. Next, the consumer can use a user interface, such as a graphical user interface, controller, or other virtual reality device to select the multidimensional content that the consumer desires to experience and that the consumer desires the system to display. Next, consumers or users can use the virtual reality device or terminal to select the virtual environment the user intends to navigate or experience.

Next, the system will generate environment data 306 multi-dimensional virtual reality graphical environment including the avatar of the consumer and transmit the data so that other consumers can view the avatars and multidimensional content. As mentioned above, the virtual reality environment may include various types of settings.

Next, the consumer explores, navigates and experiences the environment that the consumer has selected. The system 300 provides haptic data 308 that corresponds to the content displayed on the virtual reality devices and terminals and allows the user to more fully immerse and interact within the virtual reality environment by providing haptic data that corresponds to the images and sounds that the consumers experience through the virtual reality devices 206, 212.

For example, in one non-limiting embodiment, the haptic system 214, 216 may be horizontally aligned. The environment data 306 may include data that when displayed on the virtual reality device is depicted as steps or a staircase. Haptic data 308 may also be provided to the haptic system that corresponds to the environment data and the haptic system may move certain rod portions of the haptic system. As the certain rod portions move, certain tubes are extended so that a series of steps or a staircase is formed and that corresponds to content that is displayed to the user on the virtual reality device.

By way of another example, if a surface having a rough or jagged texture is displayed on the virtual reality device, then haptic data will be provided to the computing device of the haptic system so that the certain rod portions of the system will be moved to define a jagged or rough surface that corresponds to content that is displayed to the user on the virtual reality device. As a result, a user can interact with the haptic system so that the user can touch, feel and/or experience the content that is displayed on the virtual reality device. The haptic system allows a consumer to touch, hold, move, and otherwise inspect, using the sense of touch, content within the virtual reality environment. The system may also be configured to provide haptic feedback data 310. After a user interacts with the haptic system, the rod portions may become moved due to forces acting on the pistons. The haptic system may use the sensors 191, 192 positioned within the system to determine the position of the telescoping tube portions. The feedback data 310 provided by the sensors allows the processor to control or adjust the positions of the rod portions so that the shapes defined by the haptic system corresponds to the content displayed by the virtual reality devices, which corresponds to the virtual reality environment.

Figure 4:
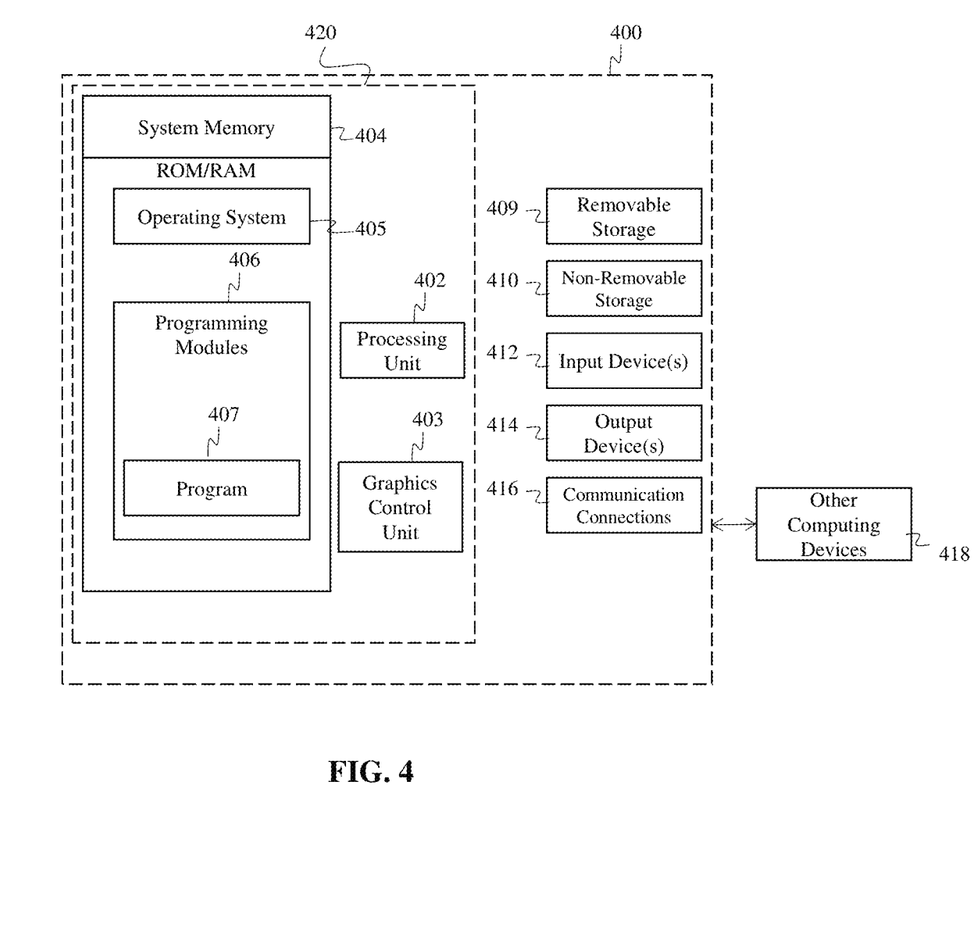

FIG. 4 is a block diagram of a system including an example computing device 400 and other computing devices. Consistent with the embodiments described herein, the aforementioned actions performed by server 202 may be implemented in a computing device, such as the computing device 400 of FIG. 4. Any suitable combination of hardware, software, or firmware may be used to implement the computing device 400. The aforementioned system, haptic system, and processors are examples and other systems, devices, and processors may comprise the aforementioned computing device. Furthermore, computing device 400 may comprise an operating environment for the methods shown in FIG. 2 and the device of FIGS. 1-1B above.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination of memory. System memory 404 may include operating system 405, one or more programming modules 406 (such as program module 407). Operating system 405, for example, may be suitable for controlling computing device 400's operation. In one embodiment, programming modules 406 may include, for example, a program module 407. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 may perform processes including, for example, one or more of the methods shown in FIG. 2 above. Computing device 402 may also include a graphics processing unit 403 which supplements the processing capabilities of processor 402 and which may execute programming modules 406, including all or a portion of those processes and methods shown in FIG. 2 and for devices illustrated in FIGS. 1-1B above. The aforementioned processes are examples, and processing units 402, 403 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage media, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A physically interactive haptic system for a virtual reality environment, the system comprising:
   a plurality of actuating cylinders arranged perpendicularly to a plane that is horizontally situated, each said cylinder comprising a rod portion that moves within a series of telescoping-tube portions, and wherein each said cylinder is designed to support weight;
   a computing device, including a processor, for individually controlling each of the plurality of actuating cylinders, wherein the computing device is configured for sending command signals to each of the plurality of actuating cylinders, wherein a command signal instructs an actuating cylinder to move a rod portion within a telescoping-tube portion, so as to physically create a haptically-enhanced object in the virtual reality environment; and a plurality of couplings for individual conductively coupling each of the plurality of actuating cylinders to the computing device.

2. The physically interactive haptic system for a virtual reality environment of claim 1, wherein the rod portions have a maximum stroke-length defined by a maximum distance the rod portions move relative to the actuating cylinder, and wherein the computing device is configured to move the rod portions to a plurality of stroke length positions that are less than the maximum stroke length of the rod portions.

3. The physically interactive haptic system of claim 1, wherein the rod portions are configured to be moved by a pneumatic device configured for receiving commands from the processor of the computing device.

4. The physically interactive haptic system of claim 1, wherein the rod portions are configured to be moved by a hydraulic device configured for receiving commands from the processor of the computing device.

5. The physically interactive haptic system of claim 1, wherein the rod portions are configured to be moved by a magnetic device configured for receiving commands from the processor of the computing device.

6. The physically interactive haptic system of claim 1, wherein the rod portions are configured to be moved by an electric motor configured for receiving commands from the processor of the computing device.

7. The physically interactive haptic system of claim 1, wherein the processor is configured for receiving a plurality of environment data corresponding to the virtual reality environment, and wherein the processer is configured for converting the environment data to a plurality of command signals to instruct actuating cylinders to move the rod portion within a telescoping-tube portion so as to physically create a haptically-enhanced object.

8. A physically interactive haptic system for a virtual reality environment, the system comprising:

a plurality of actuating cylinders arranged perpendicularly to a plane, each said cylinder comprising a rod portion that moves within at least one other telescoping-tube portions, and wherein each said cylinder is designed to support the weight of a human, and wherein the rod portions have a maximum stroke-length defined by a maximum distance the rod portions move relative to the actuating cylinder;

at least one sensor for monitoring the position of the telescoping tube portions of the system;

a computing device, including a processor, for individually controlling each of the plurality of actuating cylinders, wherein the computing device is configured for sending command signals to each of the plurality of actuating cylinders, wherein a command signal instructs an actuating cylinder to move a rod portion within a telescoping-tube portion, so as to physically create a haptically-enhanced object in the virtual reality environment;

wherein the computing device is also configured to move the rod portions to a plurality of stroke length positions that are less than the maximum stroke length of the rod portions;

wherein the computing device is also configured for receiving a plurality of environment data corresponding to the virtual reality environment, and wherein the computing device is configured for converting the environment data to a plurality of command signals to instruct actuating cylinders to move the rod portion within a telescoping-tube portion so as to physically create a haptically-enhanced object; and a plurality of couplings for individual conductively coupling each of the plurality of actuating cylinders to the computing device.

9. The physically interactive haptic system of claim 8, wherein the plane is horizontally situated, vertically situated, diagonally situated or any combination thereof.

10. The physically interactive haptic system of claim 8, wherein the rod portions are configured to be moved by a pneumatic device configured for receiving commands from the processor of the computing device.

11. The physically interactive haptic system of claim 8, wherein the rod portions are configured to be moved by a hydraulic device configured for receiving commands from the processor of the computing device.

12. The physically interactive haptic system of claim 8, wherein the rod portions are configured to be moved by an electric motor configured for receiving commands from the processor of the computing device.

13. The physically interactive haptic system of claim 8, wherein the rod portions are configured to be moved by a magnetic device configured for receiving commands from the processor of the computing device.

* * * * *